United States Patent [19]

Smith et al.

[11] E Re. 30,954

[45] Reissued Jun. 1, 1982

[54] WHEELCHAIRS

[76] Inventors: Royal Smith, 4646 Dover St., NE., St. Petersburg, Fla. 33703; Edward H. D. Carson, 200 Country Club Dr., Largo, Fla. 33540

[21] Appl. No.: 72,641

[22] Filed: Sep. 5, 1979

Related U.S. Patent Documents

Reissue of:

[64] Patent No.: 4,046,418
Issued: Sep. 6, 1977
Appl. No.: 707,203
Filed: Jul. 21, 1976

[51] Int. Cl.[3] ..... A47C 13/00; A47C 1/035

[52] U.S. Cl. ..... 297/118; 297/81; 297/DIG. 4

[58] Field of Search ..... 297/90, DIG. 4, 322, 297/323, 80, 81, 83, 119, 118; 5/67

[56] References Cited

U.S. PATENT DOCUMENTS

| | | | |
|---|---|---|---|
| 416,906 | 12/1889 | Flowers | 297/81 |
| 611,049 | 9/1898 | Allen | 297/90 |
| 1,553,689 | 9/1925 | Hill | 297/90 |
| 1,748,784 | 2/1930 | Mierley | 297/90 |
| 2,375,151 | 5/1945 | Troxell | 297/83 |
| 2,857,954 | 10/1958 | Voelker et al. | 297/83 |
| 3,132,897 | 5/1964 | Linden | 297/322 |
| 3,147,039 | 9/1964 | Smith et al. | 297/90 |
| 3,489,459 | 1/1970 | Katan, Sr. et al. | 297/316 |

FOREIGN PATENT DOCUMENTS

| | | | |
|---|---|---|---|
| 163976 | 3/1955 | Australia | 5/67 |

*Primary Examiner*—Francis K. Zugel
*Attorney, Agent, or Firm*—Brady, O'Boyle & Gates

[57] ABSTRACT

A wheelchair is disclosed which is convertible into a wheeled stretcher, wherein the chair seat will assume a comfortable angle with respect to the horizontal when the chair is in the seating position and will assume a horizontal position coplanar with the back of the chair when the chair is in the stretcher position. The chair seat and back may be locked into any relative position between a fully erect seated position and a fully reclined stretcher position. Leg support members which are connected to the chair may assume any angular position with respect to the horizontal without regard for the relative positions of the seat and back of the chair. The leg support members may have their lengths independently adjusted.

10 Claims, 7 Drawing Figures

FIG. 1
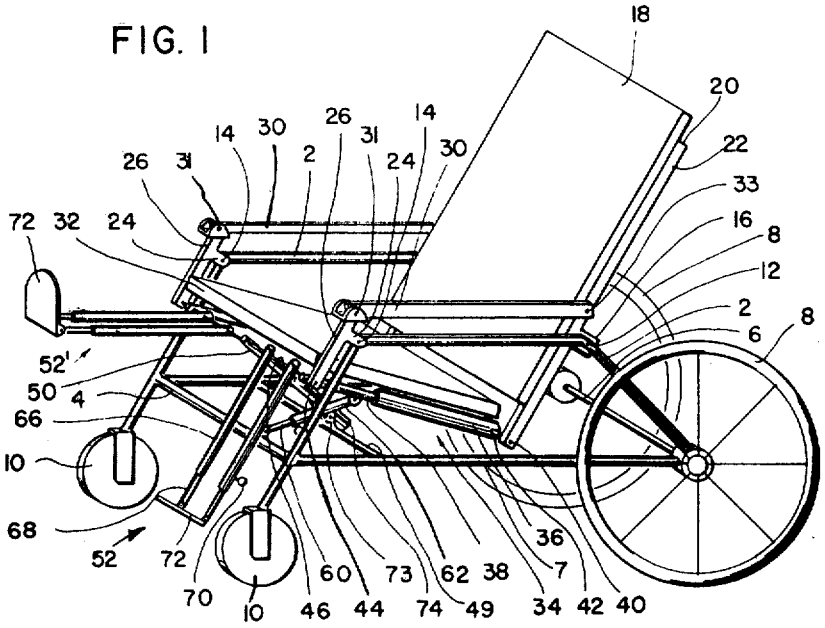
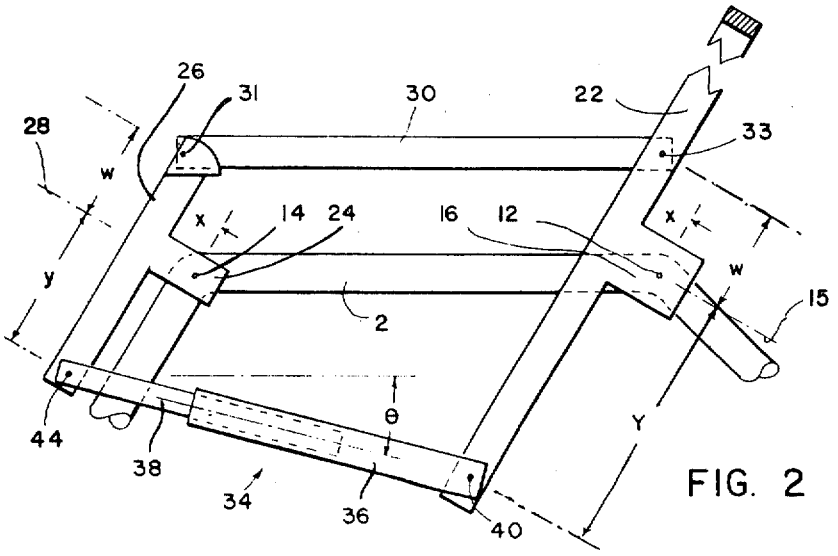
FIG. 2

WHEELCHAIRS

Matter enclosed in heavy brackets [ ] appears in the original patent but forms no part of this reissue specification; matter printed in italics indicates the additions made by reissue.

FIELD OF THE INVENTION

The invention disclosed relates to wheelchairs and more particularly relates to wheelchairs which are convertible into wheeled stretchers.

BACKGROUND OF THE INVENTION

Hospital equipment and invalid home care equipment has become quite expensive, so that it becomes economic to combine the functions of several pieces of hospital apparatus to enable a single, combined function apparatus to have a higher frequency of utilization and therefore a greater return on investment. Following this philosphy, wheelchairs have been made, in the prior art, which are convertible into wheeled stretchers, thereby combining the function of a conventional wheelchair for transporting a patient in a seated position, with the function of a wheeled stretcher for transporting a patient in a lying position. Prior art convertible wheelchairs however, have suffered from several deficiencies. One deficiency is that in order that the seat of the prior art convertible wheelchair can assume a coplanar position with respect to the back of the chair when it is in the stretcher position, the seat must remain horizontal when the chair is in the erect seated position. A horizontal seat for a chair is uncomfortable for the patient who must remain seated thereon for long periods of time. Designers of conventional chairs have recognized that a seat which assumes a slight angle with respect to the horizontal, toward the back of the chair, is much more comfortable to sit in for long periods of time. However, prior art convertible wheelchairs have suffered from this source of discomfort to the patient. A second deficiency of prior art wheelchairs is that the leg support member which supports the patient's leg is not angularly adjustable with respect to the horizontal in a manner independent of the relative positions of the seat and the back of the chair. Thus the flexibility of the chair to accommodating various patient ailments requiring the special positioning of the patient's limbs, has not been available in prior art convertible wheelchairs. Still a third deficiency of prior art convertible wheelchairs is that the length of the leg support members for the chair have been fixed, causing the chair to be incapable of accommodating a variety of leg lengths.

OBJECTS OF THE INVENTION

It is therefore an object of the invention to provide a convertible wheelchair having a seat which will assume a comfortable angle with respect to the horizontal when the chair is in a seating position and will assume a horizontal position coplanar with the back of the chair when the chair is in a stretcher position.

It is still another object of the invention to provide a convertible wheelchair wherein the chair seat and back may be locked in any relative position between a fully erect seated position and a fully reclined stretcher position.

It is still a further object of the invention to provide a convertible wheelchair having leg support members which can assume any angular position with respect to the horizontal with no regard for the relative position of the seat and back of the chair.

It is still a further object of the invention to provide a convertible wheelchair having leg support members whose lengths may be independently adjusted.

SUMMARY OF THE INVENTION

These and other objects, features and advantages of the invention are accomplished by the convertible wheelchair invention disclosed herein. The convertible wheelchair has a seat supported by a pair of extendable seat supports, which assume a comfortable angle with respect to the horizontal when the chair is in a seating position and will assume a horizontal position coplanar with the back of the chair when the chair is in a stretcher position. A pair of wheeled support frame members are horizontally spaced from one another and have a corresponding rearwardly positioned first pivot and a forwardly positioned second pivot at substantially the same elevation. A pair of first levers, each having a first length, are pivotally mounted on respective ones of the first pivots. A chair back support having two lateral sides, each proximate to a respective one of the support frame members, is rigidly mounted to the free end of the corresponding one of the first levers. A pair of second levers, each having substantially the first length, are pivotally mounted on respective ones of the second pivots. A pair of front arms are each rigidly mounted at an intermediate point to the free end of a respective one of the second levers. A pair of linkages connect the upper end of each respective arm to the corresponding lateral side of the chair back support. The pair of extendable chair seat supports each comprise a first and second portions which slidably engage one another with the free end of the first portion pivotally connected to the corresponding one of the lateral sides of the back support at a given length below the mounting point for the corresponding one of the first levers, and the free end of the second portion is pivotally connected to the corresponding one of the front arms at a shorter length below the intermediate point on the arm. With this mechanism, the chair seat which is supported by the pair of extendable seat supports, will assume a comfortable angle with respect to the horizontal when the chair is in a seating position and will assume a horizontal position coplanar with the back of the chair in the stretcher position.

DESCRIPTION OF THE FIGURES

These and other objects, features and advantages of the invention will be more particularly appreciated with reference to the accompanying figures.

FIG. 1 is a three dimensional overall view of the convertible wheelchair invention.

FIG. 2 is a more detailed breakaway view of the chair seat mechanism.

DISCUSSION OF THE PREFERRED EMBODIMENT

Figure 3A:
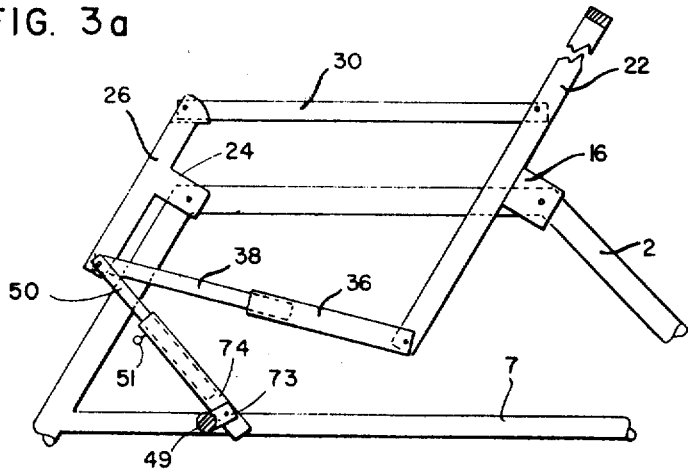
FIG. 3a illustrates the relative position of the elements for the chair seat mechanism when the chair is in a fully erect seating position.

The convertible wheelchair invention is shown in an overall three dimensional view in FIG. 1. There is seen that a pair of wheeled support frame members 2, each have larger rear wheels 8 and smaller forward wheels 10 attached thereto. The wheeled support frame members 2 are horizontally spaced from one another by means of the struts 4 and 6 and the forward portion of each support frame member is connected to the rearward portion by an additional strut 7. Each wheeled support frame member 2 has a corresponding rearwardly positioned first pivot 12 and a forwardly positioned second pivot 14 at substantially the same elevation above the ground.

As shown in FIG. 2 and 3a, a pair of first levers 16 each have a first length x and are pivotally mounted on a respective one of the first pivots 12. The chair back 18 is supported by the back support 20 which has lateral sides 22 and 22', each proximate to a respective one of the support frame members 2. Each of the lateral sides 22 and 22' is rigidly mounted at 15 to the free end of a corresponding one of the first levers 16.

A pair of second levers 24 each have substantially the first length x and are pivotally mounted on a respective one of the second pivots 14. A pair of front arms 26 are each rigidly mounted at an intermediate point 28 to the free end of the respective one of the second levers 24.

A pair of linkages 30 each have a first end pivotally connected at 31 to a respective one of the front arms 26 at a point a second length w above the intermediate point 28. The linkages 30 have a second end pivotally connected at 33 to a corresponding one of the lateral sides 22 of the back support 20 at substantially the second length w above the mounting point 15 for the corresponding one of the first levers 16. The linkages 30 can serve as arm rests for the chair.

The chair seat 32 is supported by a pair of extendable chair seat supports 34. Each chair seat support 34 is proximate to a respective one of the support frame members 2. Each extendable chair seat support 34 comprises a first portion 36 and the second portion 38 which slidably engage one another. The free end of the first portion 36 is pivotally connected at 40 by means of the cross member 42 to a corresponding one of the lateral sides 22 of the back support 20 at a third length Y below the mounting point 15 for the corresponding one of the first levers 16. The free end of the second portion 38 is pivotally connected at 44 by means of the cross member 46 to a corresponding one of the front arms 26 at a fourth length y below the intermediate point 28. The third length Y is greater than the fourth length y so that the extendable seat support 34 will assume a comfortable angle $\theta$ with respect to the horizontal when the chair is in a seating position as is shown to better advantage in FIG. 3a and will assume a horizontal position coplanar with the back 18 of the chair when the chair is in the stretcher position, shown to better advantage in FIG. 3c.

Figure 3B:
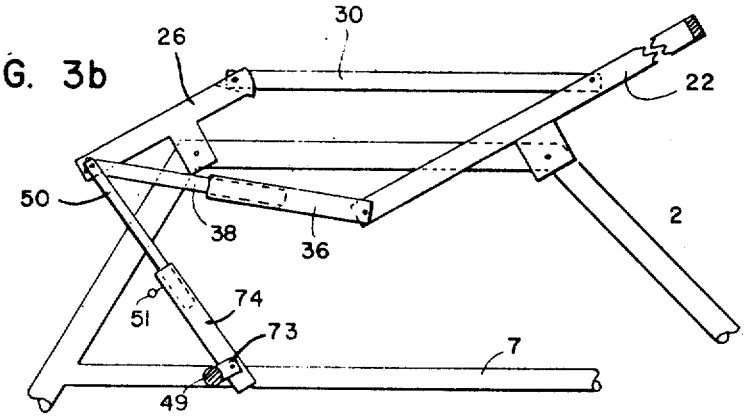
FIG. 3b illustrates the chair of FIG. 3a, at a position intermediate between the fully erect seated position and a fully reclining stretcher position.
Figure 3C:
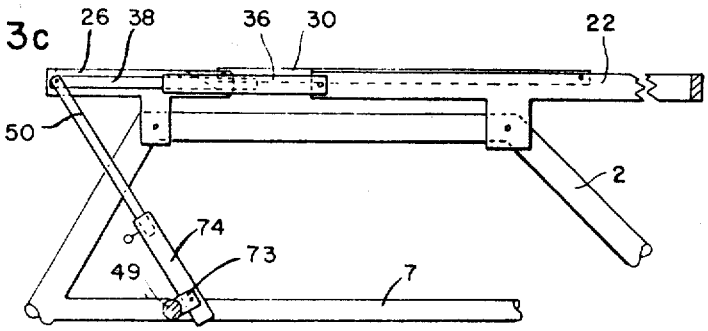
FIG. 3c illustrates the chair of FIG. 3a, in the fully reclining stretcher position.
Figure 5:
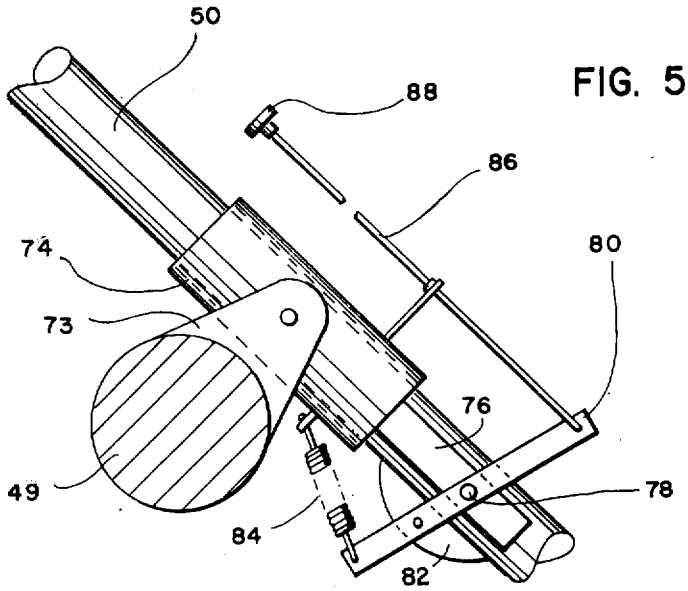
FIG. 5 is a detailed illustration of the locking mechanism for the seat of the chair.

The chair seat 32 and back 18 may be locked in any relative position between a fully erect seated position as is shown in FIG. 3a and a fully reclined stretcher position as is shown in FIG. 3c by means of the seat locking means such as the set screw 51 shown in FIGS. 3a–3c or the locking shoe 82 shown in FIG. 5. A cross member 49 is rigidly connected to the struts 7 on both of the wheeled support frame members 2. A first tube 74 is pivotally mounted by means of the pivot mount 73 to the cross member 49. A second tube 50 is mounted in sliding engagement with the first tube 74, with its free end pivotally connected to the cross member 46 which, in turn, is connected to the pair of extendable seat supports 34. A locking means mounted to the first tube 74 comprises the extensions 76 having a first end rigidly mounted to the tube 74 and a second end which forms a pivot point 78 for the arms 80. Pivotally attached to the arms 80 is a locking shoe 82 which can selectively frictionally engage the second tube 50. Locking arms 80 are loaded by the tension spring 84 so as to normally cause the engagement of the locking shoe with the tube 50. Control cable 86 connected to the arms 80, permits the selective engagement of the locking shoe with respect to the tube 50, by actuating knob 88.

Figure 4:
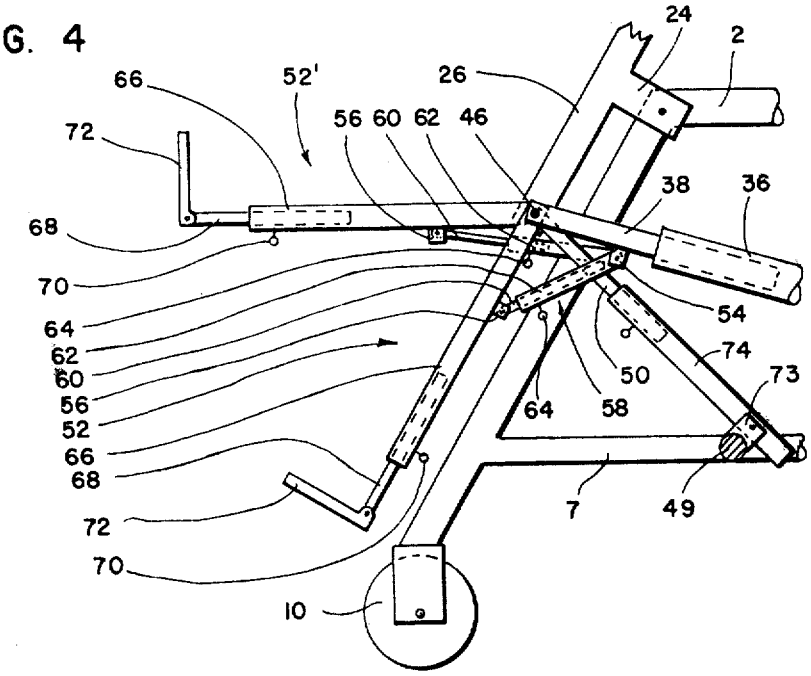
FIG. 4 further illustrates the leg support mechanism of the chair.

FIG. 4 illustrates the leg support member 52 which can assume any angular position with respect to the horizontal without regard for the relative position of the seat 32 and back 18 of the chair. The leg support member 52 is pivotally mounted on the cross member 46. The cross member 46 connects to the second portions 38 of each of the pair of extendable seat supports 34. A first tube 62 is pivotally mounted by means of the pivot 54 on the second portion 38 of one of the pair of extendable seat supports 34 in a position rearward of the mounting point at the cross member 46 for the leg support member 52. A second tube 60 is mounted in sliding engagement with the first tube 62, with its free end pivotally connected at pivot 56 to the leg support member 52. A locking means 64 which may be a set screw for example, is mounted on the first tube 62 and may be placed in selective frictional engagement with the second tube 60. In this manner, the leg support member 52 can assume any angular position with respect to the horizontal without regard for the relative position of the seat 32 and back 18 of the chair. There are two leg support members 52 and 52' and each has the corresponding elements described above and are capable of independent adjustment of their relative position.

Each leg support member 52 and 52' may have its length adjusted to accommodate varying leg sizes. The leg support member comprises a first and second outer tubes 66, each pivotally mounted on the cross member 46. The cross member 46 is, in turn, mounted to the second portion 38 of each of the pair of extendable seat supports 34. A first and second inner tubes 68 are each mounted in sliding engagement with a respective one of the outer tubes 66. A foot rest means 72 which may be, for example, a folding foot rest of conventional design, is mounted on the free ends of the inner tubes 68. A locking means 70 which may be for example, a set screw, is mounted on one of the outer tubes 66 and may be placed in selective frictional engagement with the corresponding one of the inner tubes 68. In this manner, each leg support member 52 and 52' may have its length independently adjusted.

Although the invention has been described with some specificity, it is understood that the present disclosure is made only by way of example and that many changes in the details of construction and the combination and the arrangement of the elements may be made without departing from the spirit and the scope of the invention.

We claim:

1. A wheelchair convertible into a wheeled stretcher, comprising:

a pair of wheeled support frame members horizontally spaced from one another, each having a corresponding rearwardly positioned first pivot and a forwardly positioned second pivot at substantially the same elevation;

a pair of first levers, each having a first length and pivotally mounted on a respective one of said first pivots;

a chair back support having two lateral sides each proximate to a respective one of said support frame members, each rigidly mounted to the free end of a corresponding one of said first levers;

a pair of second levers, each having substantially said first length and pivotally mounted on a respective one of said second pivots;

a pair of front arms, each rigidly mounted at an intermediate point to the free end of a respective one of said second levers;

a pair of linkages, each having a first end pivotally connected to a respective one of said front arms at a point a second length above said intermediate point and a second end pivotally connected to a corresponding one of said lateral sides of said back support at substantially said second length above said mounting point for the corresponding one of said first levers;

a pair of extendable chair seat supports, each proximate to a respective one of said support frame members, each comprising a first and second portions which slideably engage one another with the free end of said first portion pivotally connected to a corresponding one of said lateral sides of said back support at a third length below said mounting point for the corresponding one of said first levers and with the free end of said second portion pivotally connected to a corresponding one of said front arms at a fourth length below said intermediate point, said third length being greater than said fourth length;

whereby a chair seat supported by said pair of extendable seat supports, will assume a comfortable angle with respect to the horizontal when the chair is in a seating position, and will assume a horizontal position coplanar with the back of the chair when the chair is in a stretcher position.

2. The apparatus of claim 1, which further comprises:

a first tube pivotally mounted to said pair of support frame members;

a second tube mounted in sliding engagement with said first tube, with its free end pivotally connected to said second portions of said pair of extendable seat supports;

locking means mounted on said first tube and in selective frictional engagement with said second tube;

whereby said chair seat and back may be locked in any relative position between a fully erect seated position and a fully reclined stretcher position.

3. The apparatus of claim 1, which further comprises:

a leg support member pivotally mounted on said second portions of said pair of extendable seat supports;

a first tube pivotally mounted on said second portion of one of said pair of extendable seat supports, rearwardly of the mounting point for said leg support member;

a second tube mounted in sliding engagement with said first tube, with its free end pivotally connected to said leg support member;

locking means mounted on said first tube and in selective frictional engagement with said second tube;

whereby said leg support member can assume any angular position with respect to the horizontal without regard for the relative positions of said seat and back of the chair.

4. The apparatus of claim 3, wherein said leg support member further comprises:

a first and second outer tubes, each pivotally mounted on said second portions of said pair of extendable seat supports;

a first and second inner tubes, each mounted in sliding engagement with a respective one of said outer tubes;

a foot rest means mounted on the free ends of said inner tubes;

a locking means mounted on one of said outer tubes and in selective frictional engagement with the corresponding one of said inner tubes;

whereby said leg support member may have its length adjusted.

5. The apparatus of claim 4, which further comprises two of said leg support members being so mounted on the chair, capable of independent adjustment of their relative positions.

*6. A wheelchair convertible into a wheeled stretcher, comprising:*

*a pair of wheeled support frame members, horizontally spaced from one another, each having a corresponding rearwardly positioned first pivot, and a forwardly positioned second pivot at substantially the same elevation;*

*a pair of first lever means, each having a first length and pivotally mounted on a respective one of said first pivots;*

*a chair back support having two lateral sides, each proximate to a respective one of said support frame members and each rigidly mounted to the free end of a corresponding one of said first lever means;*

*a pair of second lever means, each having substantially said first length and pivotally mounted on a respective one of said second pivots;*

*a pair of front arm members, each rigidly mounted at an intermediate point to the free end of a respective one of said second lever means;*

*a pair of linkages, each having a first end pivotally connected to one of said front arm members at a point a second length above said intermediate point and a second end pivotally connected to a corresponding one of said lateral sides of said back support at substantially said second length above said mounting point for the corresponding one of said first lever means;*

*a pair of seat support members, pivot means connecting one end of said pair of seat support members to said chair back support at a third length below said mounting point for the corresponding one of said first lever means, the opposite end of said pair of seat support members being supported by the lower portion of said front arm members at a fourth length below said intermediate point, said third length being greater than said fourth length to thereby position said seat support at an angle θ to the horizontal; and lost motion means operatively connected between said opposite end of said seat support members and the lower portion of said front arm members; the chair back support, the front arm members, the linkages and associated pivot points to said front arm members and said back support, the seat support members and*

*associated pivot means on said chair back and lost motion means on said front arm members, all being substantially horizontally coplanar when the chair is folded to a stretcher position,*

*whereby a chair seat supported by said pair of seat support members will assume a comfortable angle with respect to the horizontal when the chair is in a seating position, and will assume a horizontal position coplanar with the back of the chair when the chair is in a stretcher position.*

*7. The apparatus of claim 6 which further comprises a pair of leg support members operatively supported by said chair and being capable of independent adjustment of their relative positions.*

*8. The apparatus of claim 6 which further comprises:*

*a first tube pivotally mounted to said pair of support frame members;*

*a second tube mounted in sliding engagement with said first tube, with its free end pivotally connected to said pair of seat support members;*

*locking means mounted on said first tube and in selective frictional engagement with said second tube;*

*whereby said chair seat back may be locked in any relative position between a fully erect seated position and a fully reclined stretcher position.*

*9. The apparatus of claim 6 which further comprises:*

*leg support means pivotally mounted on said pair of seat supports;*

*a first tube pivotally mounted on said pair of seat supports rearwardly of the mounting point for said leg support means;*

*a second tube mounted in sliding engagement with said first tube, with its free end pivotally connected to said leg support means; and*

*locking means mounted on said first tube and in selective frictional engagement with said second tube; whereby said leg support means can assume any angular position with respect to the horizontal without regard for the relative positions of said seat and back of the chair.*

*10. The apparatus of claim 9 wherein said leg support means further comprises:*

*first and second outer tubes each pivotally mounted on said pair of seat supports;*

*first and second inner tubes, each mounted in sliding engagement with a respective one of said outer tubes;*

*foot rest means mounted on the free ends of said inner tubes; and*

*locking means mounted on one of said outer tubes and in selective fricitional engagement with the corresponding one of said inner tubes;*

*whereby said leg support means may have its length adjusted.*

* * * * *